Oct. 11, 1938.  B. H. CARROLL  2,132,866
PHOTOGRAPHIC EMULSION
Filed March 29, 1937
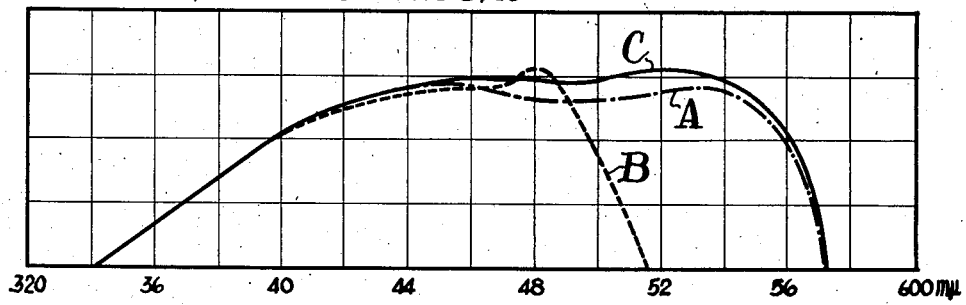
Burt H. Carroll,
INVENTOR:
N. M. Perrins
Daniel J. Mayne
ATTORNEYS.

Patented Oct. 11, 1938

2,132,866

UNITED STATES PATENT OFFICE 2,132,866

PHOTOGRAPHIC EMULSION

Burt H. Carroll, Rochester, N. Y., assignor to Eastman Kodak Company, Rochester, N. Y., a corporation of New Jersey Application March 29, 1937, Serial No. 133,588

12 Claims. (Cl. 95—7)

This invention relates to sensitized photographic emulsions and more particularly to photographic emulsions, such as those of the gelatino-silver-halide type, containing a mixture or combination of two or more sensitizing materials, at least one of which cooperates with at least one other to alter the sensitivity of the emulsion to a greater degree than is possible with any one of the sensitizing materials alone. The sensitization produced by my combination is always greater, in some spectral region, than the sum total of the sensitizations produced by the separate sensitizing materials. The sensitizing materials of my combinations are substances generally referred to as dyes and more particularly as dyes of the cyanine class.

It is known in the art of making photograhic emulsions that certain dyes of the cyanine class alter the sensitivity of photographic emulsions of the gelatino-silver-halide type, when incorporated therein. The sensitizing effect produced by the dye does not increase proportionally to the amount of dye, but passes through a maximum as the concentration is increased. Within the range of concentrations most useful in practice, the sensitivity increases much more slowly than the concentration of the dye. Likewise, the combined effect of two or more dyes on an emulsion is rarely equivalent to the sum of their separate effects; in general it is much less. Most commonly, the combined effect is no greater than the effect of a single one of the dyes employed in a concentration equal to the sum of the concentrations of all the dyes in the combination. Very frequently, the combined effect of two dyes is less than that of one of them alone.

I have found with certain combinations of two or more cyanine dyes, that the combined sensitization is substantially greater, in some spectral region, than that of any one of the dyes in the absence of the other or others. I will call this phenomenon supersensitization. In general, at least one dye of my combination may be said to be supersensitized by the other or others. The dye which is supersensitized may be called the basic sensitizer and the other dye the supersensitizer. However, the effect may be mutual and the dyes indistinguishable from the standpoint of which is supersensitized.

Supersensitization is a highly specific phenomenon and is found only in mixtures or combinations of dyes from certain specific groups. Supersensitization can be most readily observed, when a dye is supersensitized in a spectral region for which the other dye does not sensitize; for example, when the red sensitization produced by dye A increases in the presence of dye B which sensitizes only for the green. When two or more dyes sensitize for approximately the same or widely overlapping spectral regions (as in a number of the cases to be described in the instant application), supersensitization can still be detected, because if supersensitization obtains in such cases the total optical sensitization produced by a combination of two or more dyes will always be greater, under favorable conditions, than that which can be produced by any dye of the combination alone at any concentration. The magnitude of the supersensitization depends upon the relative and absolute concentrations of the dyes in the emulsion and on the type of emulsion. By suitable choice of conditions supersensitization can always be made to assume values which are readily observable.

My application deals with emulsions containing supersensitizing mixtures or combinations of one or more sensitizing dyes of the 8-alkyloxacarbocyanine salts wherein the 8-alkyl group contains at least two carbon atoms with one or more sensitizing dyes of the pseudocyanine group. Just how the dyes of my mixtures cooperate to give a supersensitizing effect is not known. I shall refer to the mixtures as combinations, although I do not intend to imply that the dyes are chemically combined.

An object of my invention, therefore, is to provide photographic emulsions containing a supersensitizing combination of cyanine dyes. A further object is to provide a process for sensitizing photographic emulsions with supersensitizing combinations of cyanine dyes and to provide a method of increasing the sensitivity of photographic emulsions sensitized with cyanine dyes. A still further object is to provide a photographic element comprising a support coated with such supersensitized emulsions. Other more specific objects will become apparent hereinafter.

The dyes which I employ in my supersensitizing combinations are sensitizers of photographic emulsions when used alone. While there is more than one manner of formulating and naming the dyes which I employ in practicing my invention, it is believed that the formulas, systems of numbering and names used herein are in accordance with those used during the development of the cyanine dye art to its present stage. The most probable formulas of representative dye-types are given below in order to clearly set forth the nature of the materials employed in my supersensitizing mixtures. These formulas should not be construed as limiting my invention except as indicated in the appended claims.

Among the 8-alkyloxacarbocyanines, useful in practicing my invention are the following:

The 8-alkyloxacarbocyanines which can be represented by the following general formula:

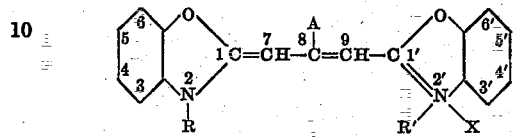

In the above formula, A represents an alkyl group of at least two carbon atoms, R and R' represent alkyl groups and X represents an acid radical. I have found it convenient to employ the carbocyanine dye-iodides (where X represents iodine) in practicing my invention. However, other dye-salts, such as the chlorides, bromides, perchlorates, alkylsulfates or alkyl-p-toluenesulfonates can be employed, for example. I have also found it advantageous to employ dyes wherein A represents an alkyl group of from two to four carbon atoms, such as ethyl, isobutyl, β-hydroxyethyl or allyl groups, for example, in practicing my invention. More specifically, I have found dyes wherein A represents ethyl and R and R' represent methyl to be especially useful. The nuclei of the dyes can carry simple substituents which do not interfere with sensitizing properties, such as, for example, alkyl, chloro, alkoxy or amino groups. Symmetrical and unsymmetrical oxacarbocyanine dyes can be employed in practicing my invention.

The 8-alkyloxacarbocyanines can be prepared by reacting 1-methylbenzoxazole quaternary salts with trialkylortho esters of monobasic carboxylic acids of three or more carbon atoms, in the presence of an organic base, e. g. dry pyridine, as described in U. S. Patent No. 1,962,124. By employing mixtures of substituted benzoxazole and unsubstituted benzoxazole quaternary salts, mixtures of symmetrical and unsymmetrical 8-alkyloxacarbocyanine dyes can be obtained.

Among the pseudocyanine dyes which can be employed in practicing my invention are the following:

The 2,2'-cyanine dyes, which can be represented by the following general formula:

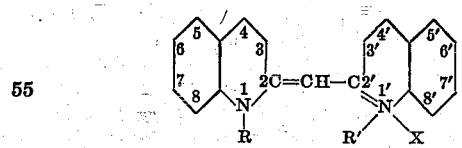

The thia-2'-cyanine dyes, which can be represented by the following general formula:

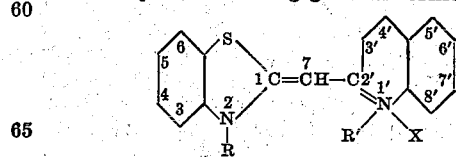

The selena-2'-cyanine dyes, which can be represented by the following general formula:

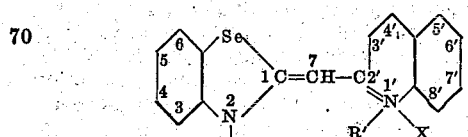

The benzothia-2'-cyanine dyes, which can be represented by the following general formula:

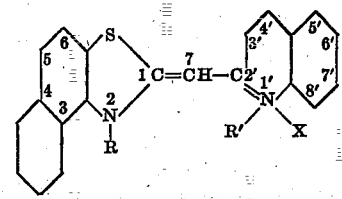

The oxazolo-2'-cyanine dyes, which can be represented by the following general formula:

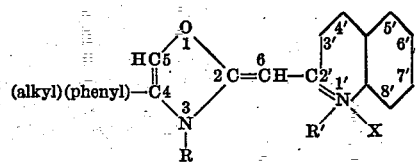

In all of the above formulas of pseudocyanine dyes, R and R' represent alkyl groups and X represents an acid radical. The oxazolo-2'-cyanines can be substituted in the 5-position with substituents, such as alkyl or aryl groups of the benzene series, for example, phenyl. In practicing my invention, I have found it convenient to employ the pseudocyanine dye-iodides (wherein X represents iodine). However, other pseudocyanine salts can be employed, such for example as the chlorides, bromides, perchlorates, alkylsulfates or alkyl-p-toluenesulfonates. I have further found it advantageous to employ pseudocyanine dyes wherein R and R' represent an alkyl group of from one to four carbon atoms. The dyes wherein R and R' represent ethyl are particularly useful in practicing my invention. The pseudocyanine dyes can be substituted in their nuclei with simple substituents which do not interfere with sensitizing properties, such for example as alkyl, chloro, alkoxy, or amino groups.

Brooker and Keyes, in the Journal of the American Society, vol. 57, pages 2488–2491 (1935) have reviewed the literature pertaining to pseudocyanine dyes and describe methods for the preparation thereof. Oxazolopseudocyanine dyes are described in U. S. Patent No. 1,969,446.

The objects of my invention can be accomplished by merely incorporating one or more sensitizing 8-alkyloxacarbocyanine dyes together with one or more sensitizing pseudocyanine dyes capable of supersensitizing the 8-alkyloxcarbocyanine in a photographic emulsion. My invention is particularly directed to the ordinarily employed gelatino-silver-halide emulsions. However, my supersensitizing combinations can be employed in emulsions in which the carrier is other than gelatin, for example, a resinous substance or cellulosic derivative which has substantially no deleterious effect on the light-sensitive materials. As silver halide emulsions, I include such emulsions as are commonly employed in the art, for example, silver chloride or silver bromide emulsions which can contain other salts which may be light-sensitive. By way of illustration, the herein described supersensitized emulsions were prepared employing an ordinary gelatino-silver-bromide emulsion of ordinary concentration (approximately 40 g. of silver halide per liter). The dyes were generally employed in concentrations of the order of 10 mg. per liter of ordinary emulsion, but can be employed in concentrations several times greater or less than that. The ratio of concentration of the 8-alkyloxacarbocyanine dye to the concentration of the pseudocyanine dye may be varied widely from 5:1 to 1:5, for example. The most favorable conditions for supersensitization of the desired magnitude must be determined by experiment, the manner of which will be apparent to those skilled in the art upon a complete perusal of these specifications.

The methods of incorporating dyes in emulsions are simple and well known to those skilled in the art. In practicing my invention, the dyes of my combinations can be added separately or together. It is convenient to add the dyes separately in the form of their solutions in appropriate solvents. The solvent must, of course, be compatible with the emulsion, substantially free from any deleterious effect on the light-sensitive materials and capable of dissolving the dyes. Methanol has proven satisfactory as a solvent for the dyes in practicing my invention. The dyes are advantageously incorporated in the finished, washed emulsion and should be uniformly distributed throughout the emulsion. The emulsion can then be converted into a photographic element by coating upon a support, such as glass, cellulose acetate, cellulose nitrate or other cellulose derivative or resin in a manner well known in the art.

The accompanying drawing is by way of illustration and depicts the supersensitizing effect of my new combinations. The figure of the drawing is a diagrammatic reproduction of three spectrograms showing, first, the sensitivity of a silver bromide emulsion containing an 8-alkyloxacarbocyanine dye (represented by the dot-and-dash line), second, the sensitivity of the same silver bromide emulsion containing a pseudocyanine dye (represented by the dotted line), and third, the sensitivity of the same emulsion containing a mixture or combination of the said 8-alkyloxacarbocyanine dye with the said pseudocyanine dye (represented by the solid line). The supersensitizing effect is apparent from the drawing.

More specifically in the drawing, curve A represents the sensitivity of an ordinary gelatino-silver-bromide emulsion containing 2,2'-dimethyl-8-ethyloxacarbocyanine iodide in a concentration of 10 mg. per liter of emulsion; curve B represents the sensitivity of the same emulsion containing 3,1'- diethyl-4-phenyloxazolo-2'- cyanine iodide in a concentration of 10 mg. per liter of emulsion, and curve C represents the same emulsion containing 2,2'-dimethyl-8-ethyloxacarbocyanine iodide and 3,1'-diethyl-4-phenyloxazolo-2'-cyanine iodide in concentrations of 10 mg. and 15 mg. per liter, respectively. The sensitivity of the emulsion represented by curve C, as measured through a Minus Blue Wratten No. 12 Filter, is about 40% greater than that of the emulsion represented by curve A.

The spectrograms corresponding to the figures of the accompanying drawing were made in a wedge spectrograph. The intensity of each horizontal line was approximately one-tenth that at the next lower line. Where the spectrograms were compared as in the drawing, the exposures were for the same time and the test plates of each dye were developed together.

The other of my combinations of 8-alkyloxacarbocyanines with pseudocyanines likewise show supersensitizing effects. The 2,2'-dimethyl-8-ethyloxacarbocyanines are of particular utility in practicing my invention. Pseudocyanine dyes containing the 5,6-benzothia- nucleus are usually of lesser utility in practicing my invention. The oxazolopseudocyanine dyes substituted in the 4-position of the oxazole nucleus by an alkyl group, such as methyl, or by an aryl group, such as phenyl, for example, are especially useful in practicing my invention.

Among others, the following combinations have been found to be particularly useful:

| 8-alkyloxacarbocyanines | | Pseudocyanines |
|---|---|---|
| 2,2'-dimethyl-8-ethyloxacarbocyanine iodide | with | 1,1'-diethyl-2,2'-cyanine iodide. |
| 2,2'-dimethyl-8-ethyloxacarbocyanine iodide | with | 2,1'-diethylthia-2'-cyanine iodide. |
| 2,2'-dimethyl-8-ethyloxacarbocyanine iodide | with | 3,1'-diethyl-4-phenyloxazolo-2'-cyanine iodide. |
| 2,2'-dimethyl-8-ethyloxacarbocyanine iodide | with | 2,1'-diethyl-4-chlorothia-2'-cyanine iodide. |

In general, it can be said of my combinations that the oxacarbocyanine is the dye supersensitized (basic supersensitizer) and that the pseudocyanine is the supersensitizer. However, the nature of this relationship between the dyes of my combinations is frequently difficult to determine and is, in fact, immaterial to the practice of my invention.

Still further examples showing the application of my invention could be cited, but the foregoing will be sufficient to teach those skilled in the art the manner in which my invention is carried out and the principles of sensitizing photographic emulsions with supersensitizing combinations, such as described herein. While I have illustrated only combinations containing two dyes, my combinations can as well contain one oxacarbocyanine cooperating with two or more pseudocyanine dyes. Likewise my combinations can contain one pseudocyanine dye cooperating with two or more oxacarbocyanine dyes.

Cyanine dyes containing hydroxyalkyl groups can be prepared from cyclammonium quaternary salts prepared by reacting heterocyclic nitrogen bases with halohydrins, e. g. ethylene halohydrins and propylene halohydrins. It is advantageous to employ the bromohydrins. The heterocyclic nitrogen base and the bromohydrin are merely heated together for several hours, e. g. 25 to 30 hours or longer, at about 100° C., though 150° C. can be employed. An excess of the bromohydrin is advantageously employed. Following the reaction, the solid reaction product is advantageously converted to the iodide by treatment with potassium iodide. This can be accomplished by dissolving the crude quaternary bromide in hot water and treating the solution with a hot aqueous solution of potassium iodide (1 g. per cc. of water). Cyanine dyes containing hydroxyalkyl groups are described in the application of Leslie G. S. Brooker and Lloyd A. Smith, Serial No. 133,524, filed of even date herewith.

What I claim and desire to be secured by Letters Patent of the United States is:

1. A photographic silver halide emulsion containing a supersensitizing combination of at least one sensitizing dye, selected from the group consisting of 8-alkyloxacarbocyanine dyes in which the 8-alkyl group contains at least two carbon atoms, with at least one sensitizing pseudocyanine dye.

2. A photographic gelatino-silver-halide emulsion containing a supersensitizing combination of at least one sensitizing dye selected from the group consisting of 8-alkyloxacarbocyanine dyes in which the 8-alkyl group contains at least two carbon atoms, with at least one sensitizing pseudocyanine dye.

3. A photographic gelatino-silver-halide emulsion containing a supersensitizing combination of at least one sensitizing dye selected from the group consisting of 8-alkyloxacarbocyanine dyes in which the 8-alkyl group contains at least two carbon atoms, with at least one sensitizing thia-2'-cyanine dye.

4. A photographic gelatino-silver-halide emulsion containing a supersensitizing combination of at least one sensitizing dye selected from the group consisting of 8-alkyloxacarbocyanine dyes in which the 8-alkyl group contains at least two carbon atoms, with at least one sensitizing 2,2'-cyanine dye.

5. A photographic gelatino-silver-halide emulsion containing a supersensitizing combination of at least one sensitizing dye selected from the group consisting of 8-alkyloxacarbocyanine dyes in which the 8-alkyl group contains at least two carbon atoms, with at least one sensitizing oxazolo-2'-cyanine dye.

6. A photographic gelatino-silver-halide emulsion containing a supersensitizing combination of at least one 2,2'-dimethyl-8-ethyloxacarbocyanine dye with at least one thia-2'-cyanine dye.

7. A photographic gelatino-silver-halide emulsion containing a supersensitizing combination of at least one 2,2'-dimethyl-8-ethyloxacarbocyanine dye with at least one 2,2'-cyanine dye.

8. A photographic gelatino-silver-halide emulsion containing a supersensitizing combination of at least one 2,2'-dimethyl-8-ethyloxacarbocyanine dye with at least one oxazolo-2'-cyanine dye.

9. A photographic gelatino-silver-halide emulsion containing a supersensitizing combination of at least one 2,2'-dimethyl-8-ethyloxacarbocyanine halide with at least one 2,1'-diethylthia-2'-cyanine halide.

10. A photographic gelatino-silver-halide emulsion containing a supersensitizing combination of at least one 2,2'-dimethyl-8-ethyloxacarbocyanine halide with at least one 1,1'-diethyl-2,2'-cyanine halide.

11. A photographic gelatino-silver halide emulsion containing a supersensitizing combination of at least one 2,2'-dimethyl-8-ethyloxacarbocyanine halide with at least one 3,1'-diethyl-4-phenyloxazolo-2'-cyanine halide.

12. A photographic gelatino-silver-halide emulsion containing a supersensitizing combination of at least one sensitizing dye selected from the group consisting of 8-alkyloxacarbocyanine dyes in which the 8-alkyl group contains at least two carbon atoms, with at least one sensitizing dye selected from the group consisting of 2,2'-cyanine dyes, thia-2'-cyanine dyes, selena-2'-cyanine dyes, 3,4-benzothia-2'-cyanine dyes and oxazolo-2'-cyanine dyes.

BURT H. CARROLL.